S. KEIM.
Millstone Dress.

No. 205,557. Patented July 2, 1878.

WITNESSES
Achilles Schehl.
C. Sedgwick

INVENTOR:
S. Keim
BY Munn & Co
ATTORNEYS.

UNITED STATES PATENT OFFICE.

SAMUEL KEIM, OF ALTOONA, PENNSYLVANIA.

IMPROVEMENT IN MILLSTONE-DRESSES.

Specification forming part of Letters Patent No. 205,557, dated July 2, 1878; application filed June 4, 1878.

*To all whom it may concern:*

Be it known that I, SAMUEL KEIM, of Altoona, in the county of Blair and State of Pennsylvania, have invented a new and Improved Millstone-Dress, of which the following is a specification:

In grinding wheat for flouring, the point to be attained is to crush and pulverize the flour of the grain and free the hull from the flour without breaking up the hull more than is necessary, so that in the subsequent bolting operation the greatest possible quantity of flour may be obtained, and so that there may be no fine particles of bran mixed with the flour.

To obtain all the flour it is often necessary to rebolt, and sometimes regrind, the middlings, to enable the finest and whitest part of the flour to pass through the fine cloth at the upper end of the bolt. It is known that the middlings are made at or near the eye of the millstone, and as the crushed grain is thrown outward toward the skirt of the stone the broad flouring-surfaces of the stones, between the furrows, reduce the flour particles to powder.

The object of my invention is to cause the grain to be thrown away from the eye of the stone and carried to the flouring-surfaces before it is ground fine, and thereby reduce the quantity of middlings by entirely freeing and pulverizing the flour.

To attain this object I use, in connection with the leading-furrows of the stone, short furrows starting from the leading-furrows at or near the eye of the stone, and running out upon the land or flouring-surfaces toward the skirt. The effect of these furrows is to increase the draft near the eye, thereby preventing an accumulation of grain at that point, and the grinding of particles that escape without being acted upon by the flouring-surfaces.

Figure 1:
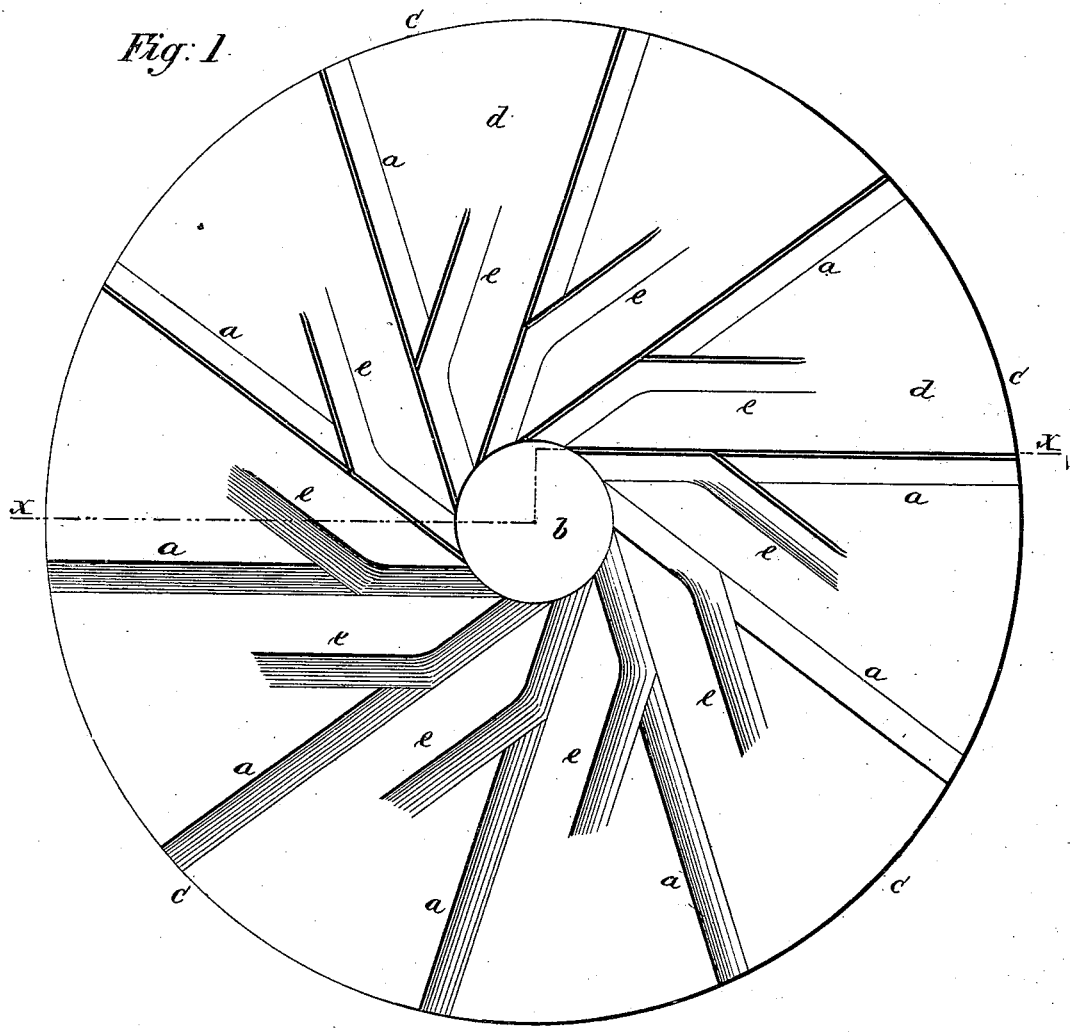
Figure 2:
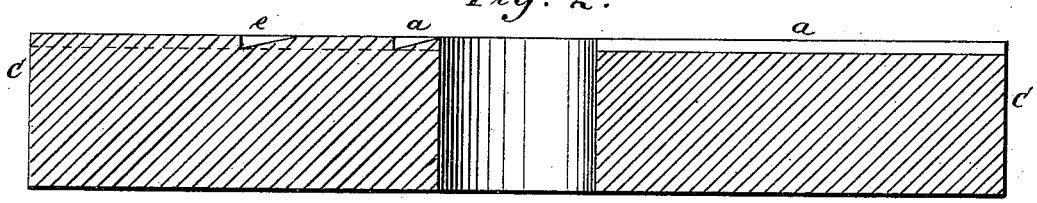

In the drawing, Figure 1 is a plan of the face of a millstone, showing my improved form of dressing; and Fig. 2 is a cross-section of the same at the line $x$ $x$.

Similar letters of reference indicate corresponding parts.

These figures represent a bed-stone furrowed to run against the sun; but it is to be understood that both stones are cut in the same manner, and either stone may be the runner, and that it may be cut to run in either direction.

$a$ $a$ are the leading or main furrows. There are ten of these shown, and they are cut in the usual manner from the eye $b$ to the skirt $c$ at the proper angle to give sufficient draft to deliver the meal freely and prevent clogging. $d$ $d$ are the flouring-surfaces between the main furrows $a$. $e$ $e$ are short furrows, commencing in the furrows $a$ at or near the eye $b$, and running out upon the land or flouring surfaces $d$. These furrows $e$ terminate about midway between the eye $b$ and skirt $c$, and run up to nothing in depth at their point of termination. The direction of these short furrows $e$ is nearly parallel with the leading-furrows.

The grain coming in at the eye $b$ is carried outward by the furrows $a$; but these furrows would not of themselves be sufficient to prevent an accumulation of grain near the eye $b$ if the grain was fed to the full grinding capacity of the stones; but the furrows $e$ take the grain from near the eye and carry it to the flouring-surfaces $d$ $d$, where it is reduced to the proper fineness for the separation of the flour by the bolt.

The width of the furrows $a$ and $e$ will be regulated by the size and quality of the stones in which they are to be cut, and I do not limit myself in this particular.

Having thus described my invention, I claim as new and desire to secure by Letters Patent—

The millstone-dress consisting of the ordinary leading-furrows $a$, running from the eye of the stone to the skirt thereof, and the short intersecting furrows $e$, running diagonally from said leading-furrows near the eye of the stone, gradually decreasing in depth, and terminating upon the flouring-surface $d$, as and for the purpose set forth.

SAMUEL KEIM.

Witnesses:
  W. M. LLOYD, Jr.,
  L. T. SIXX.